United States Patent
Wang et al.

(10) Patent No.: US 12,099,540 B2
(45) Date of Patent: Sep. 24, 2024

(54) SYSTEMS AND METHODS FOR GENERATING KEYWORD-SPECIFIC CONTENT WITH CATEGORY AND FACET INFORMATION

(71) Applicant: Walmart Apollo, LLC, Bentonville, AR (US)

(72) Inventors: Zigeng Wang, Santa Clara, CA (US); Jae Young Kim, Sunnyvale, CA (US); Tong Yao, San Jose, CA (US); Wei Shen, Pleasanton, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 28 days.

(21) Appl. No.: 18/104,091

(22) Filed: Jan. 31, 2023

(65) Prior Publication Data
US 2024/0256590 A1    Aug. 1, 2024

(51) Int. Cl.
*G06F 16/00* (2019.01)
*G06F 16/242* (2019.01)
*G06F 16/33* (2019.01)
*G06F 16/35* (2019.01)
*G06F 40/186* (2020.01)

(52) U.S. Cl.
CPC ........ *G06F 16/353* (2019.01); *G06F 16/2423* (2019.01); *G06F 16/3347* (2019.01); *G06F 40/186* (2020.01)

(58) Field of Classification Search
CPC ............. G06F 16/2423; G06F 16/3347; G06F 16/353; G06F 40/186
See application file for complete search history.

(56) References Cited

U.S. PATENT DOCUMENTS

| | | | |
|---|---|---|---|
| 2002/0002513 A1* | 1/2002 | Chiasson | G06Q 30/0643 705/26.8 |
| 2014/0149240 A1* | 5/2014 | Ansel | G06Q 20/209 705/21 |
| 2017/0193115 A1 | 7/2017 | Wan | |
| 2018/0232759 A1 | 8/2018 | Bordash et al. | |
| 2019/0034407 A1 | 1/2019 | Hagiwara et al. | |
| 2019/0392487 A1 | 12/2019 | Duke | |
| 2021/0081606 A1* | 3/2021 | Willard | G06F 40/106 |
| 2021/0133849 A1* | 5/2021 | Ghorbani | G06Q 30/0631 |
| 2022/0391590 A1 | 12/2022 | Shah et al. | |

* cited by examiner

*Primary Examiner* — Diedra McQuitery
(74) *Attorney, Agent, or Firm* — Morgan, Lewis & Bockius LLP; Manita Rawat

(57) ABSTRACT

Systems and methods of generating keyword-specific content are disclosed. A request for including a keyword is received and the keyword is classified as one of catalog related or unrelated. When the keyword is catalog related, the keyword is categorized in a category associated with the catalog and at least one term in the keyword is categorized in a facet category associated with the catalog. A content template is obtained. The content template is a category specific template when the keyword is catalog related and a generic template when the keyword is catalog unrelated. The category specific template is populated with the at least one term at a position associated with the one of the plurality of facet categories. Responsive content including the category specific template populated with the at least one term when the keyword is catalog related and the generic template when the keyword is catalog unrelated, is transmitted.

20 Claims, 12 Drawing Sheets

SYSTEMS AND METHODS FOR GENERATING KEYWORD-SPECIFIC CONTENT WITH CATEGORY AND FACET INFORMATION

TECHNICAL FIELD

This application relates generally to computer-automated generation of textual content, and more particularly, to computer-automated generation of content including facet or category specific keywords.

BACKGROUND

Search engines, indexing engines, and other computer-implemented content identification engines are configured to identify specific content and present the identified content to users in a concise and usable matter. As one example, search engines can identify specific data structures, such as webpages, items in a catalog, etc., that match search terms and present the matching data structures in a list or other interactive user interface.

Current interfaces present fixed textual data regarding identified search results in an interface. For example, current search interfaces can provide a fixed title or fixed description of an identified data structure, irrespective of the specific search query or context that preceded identification of the data structure. Although fixed titles or descriptions can provide some useful information, the fixed textual information lacks context-relevant or keyword-relevant information.

SUMMARY

In various embodiments, a system is disclosed. The system includes a non-transitory memory and a processor communicatively coupled to the non-transitory memory. The processor is configured to read a set of instructions to receive a request for responsive content including a keyword and classify the keyword as one of catalog related or catalog unrelated. Catalog related keywords are related to a catalog of items. In response to classifying the keyword as catalog related, the processor is further configured to categorize the keyword in one of a plurality of categories associated with the catalog, categorize at least one term in the keyword in one of a plurality of facet categories associated with the catalog, and obtain a content template. The content template includes a category specific template when the keyword is classified as catalog related and a generic template when the keyword is classified as catalog unrelated. In response to obtaining the category specific template, the processor is further configured to populate the category specific template with the at least one term. The at least one term is inserted into the category specific template at a position associated with the one of the plurality of facet categories. The processor is further configured to transmit responsive content to a system that generated the request. The responsive content includes the category specific template populated with the at least one term when the keyword is classified as catalog related. The responsive content includes the generic template when the keyword is classified as catalog unrelated.

In various embodiments, a computer-implemented method is disclosed. The method includes steps of receiving a request for responsive content including a keyword and classifying the keyword as one of catalog related or catalog unrelated. Catalog related keywords are related to a catalog of items. The method further includes steps of categorizing the keyword in one of a plurality of categories associated with the catalog and categorizing at least one term in the keyword in one of a plurality of facet categories associated with the catalog in response to classifying the keyword as catalog related. A content template is obtained. The content template includes a category specific template when the keyword is classified as catalog related and a generic template when the keyword is classified as catalog unrelated. The method further includes a step of populating the category specific template with the at least one term in response to obtaining the category specific template. The at least one term is inserted into the category specific template at a position associated with the one of the plurality of facet categories. The method further includes a step of transmitting responsive content to a system that generated the request. The responsive content includes the category specific template populated with the at least one term when the keyword is classified as catalog related and the generic template when the keyword is classified as catalog unrelated.

In various embodiments, a non-transitory computer-readable medium having instructions stored thereon is disclosed. The instructions, when executed by at least one processor, cause a device to perform operations including receiving a request for responsive content including a keyword and classifying the keyword as one of catalog related or catalog unrelated. Catalog related keywords are related to a catalog of items. The keyword is classified by a trained Bidirectional Encoder Representations from Transformers (BERT) model. The device further performs operations including, in response to classifying the keyword as catalog related, categorizing the keyword in one of a plurality of categories associated with the catalog using a trained semantic similarity categorization model and categorizing at least one term in the keyword in one of a plurality of facet categories associated with the catalog by a trained question answer model. A content template is obtained. The content template includes a category specific template when the keyword is classified as catalog related and a generic template when the keyword is classified as catalog unrelated. The device further performs operations including, in response to obtaining the category specific template, populating the category specific template with the at least one term. The at least one term is inserted into the category specific template at a position associated with the one of the plurality of facet categories. The device further performs operations including transmitting responsive content to a system that generated the request. The responsive content includes the category specific template populated with the at least one term when the keyword is classified as catalog related and the generic template when the keyword is classified as catalog unrelated.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
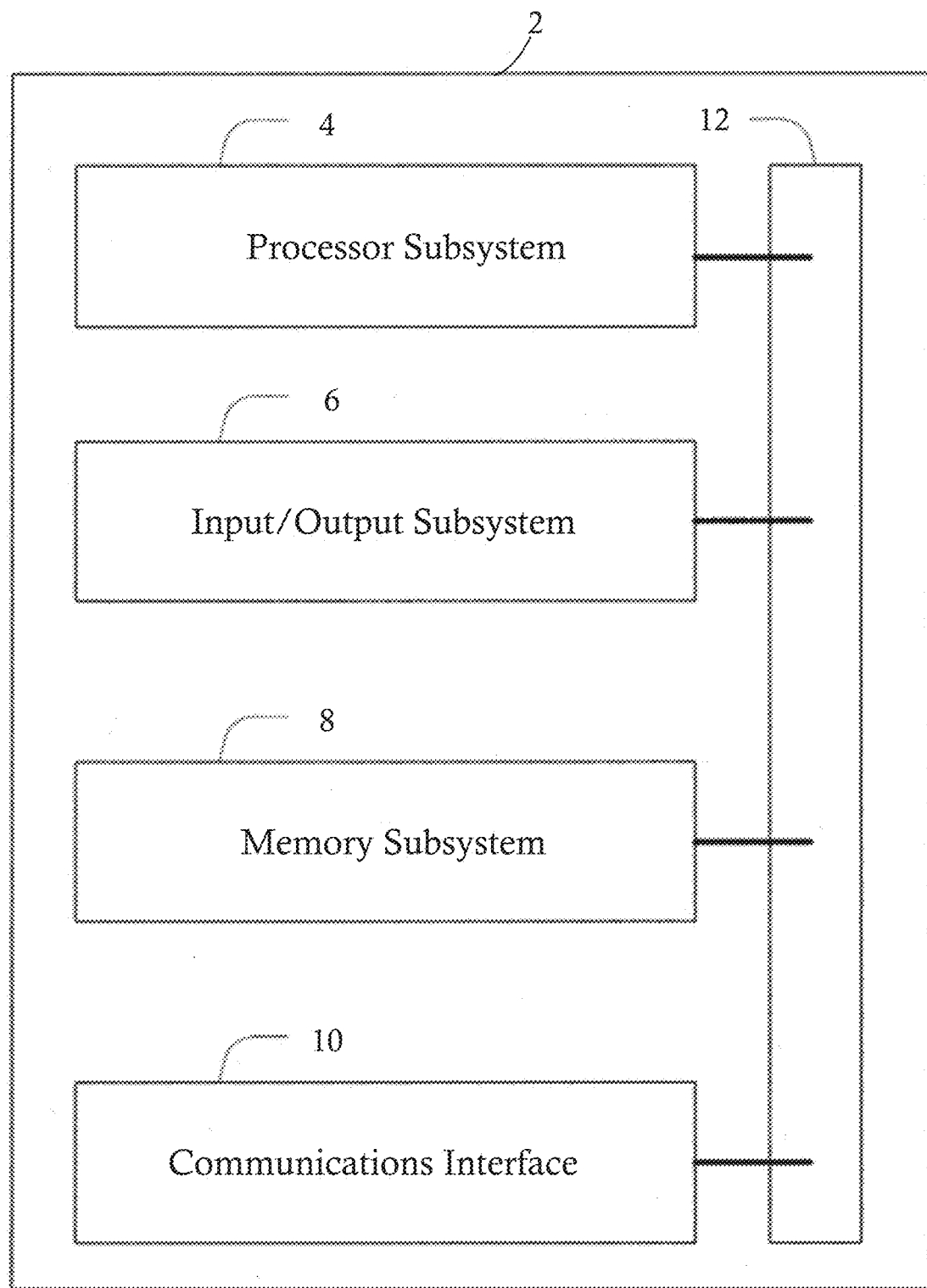
FIG. 1 illustrates a computer system configured to implement one or more processes, in accordance with some embodiments.

This description of the exemplary embodiments is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein can be assigned to the other claimed objects and vice versa. In other words, claims for the systems can be improved with features described or claimed in the context of the methods. In this case, the functional features of the method are embodied by objective units of the systems.

Furthermore, in the following, various embodiments are described with respect to methods and systems for generating keyword-responsive content elements. In various embodiments, one or more keywords are received in conjunction with a request for an interface. The requested interface can include any suitable interface, such as a search interface. A keyword categorization engine is configured to receive the set of keywords and determine whether the keywords are related to a catalog associated with a platform, such as a catalog of items, products, interface pages, etc. and/or are unrelated or generic keywords. When catalog-related keywords are identified, the catalog-related keywords are categorized into one of a lineage category or a facet category. Responsive content is generated based on the non-category related keywords and/or the categorized catalog-related keywords. In some embodiments, a default template is selected based on one or more categorizations and populated with content related to and/or selected based on the categorized catalog-related keywords. An interface is generated including the responsive content. The interface can include any suitable interface, such as a search interface.

In some embodiments, systems, and methods for generating keyword-responsive content elements includes one or more trained machine learning models, such as a trained classification model configured to classify a keyword as one of a catalog-related keyword or an unrelated keyword, a trained lineage categorization model configured to classify a keyword in one of a plurality of lineages associated with a catalog, and/or a trained facet recognition module configured to classify terms or portions of a keyword into one of a plurality of facets associated with a selected lineage. In some embodiments, a trained classification model can include a Bidirectional Encoder Representations from Transformers (BERT) model. In some embodiments, a trained lineage categorization model can include a two-tower semantic categorization model. In some embodiments, a trained facet recognition model can include a Robustly Optimized BERT-Pretraining Approach (RoBERTa) model, such as a tiny RoBERTa model.

In general, a trained function mimics cognitive functions that humans associate with other human minds. In particular, by training based on training data the trained function is able to adapt to new circumstances and to detect and extrapolate patterns.

In general, parameters of a trained function can be adapted by means of training. In particular, a combination of supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In particular, a trained function can comprise a neural network, a support vector machine, a decision tree and/or a Bayesian network, and/or the trained function can be based on k-means clustering, Qlearning, genetic algorithms and/or association rules. In particular, a neural network can be a deep neural network, a convolutional neural network, or a convolutional deep neural network. Furthermore, a neural network can be an adversarial network, a deep adversarial network and/or a generative adversarial network.

FIG. 1 illustrates a computer system configured to implement one or more processes, in accordance with some embodiments. The system 2 is a representative device and can include a processor subsystem 4, an input/output subsystem 6, a memory subsystem 8, a communications interface 10, and a system bus 12. In some embodiments, one or more than one of the system 2 components can be combined or omitted such as, for example, not including an input/output subsystem 6. In some embodiments, the system 2 can include other components not combined or comprised in those shown in FIG. 1. For example, the system 2 can also include, for example, a power subsystem. In other embodiments, the system 2 can include several instances of the components shown in FIG. 1. For example, the system 2 can include multiple memory subsystems 8. For the sake of conciseness and clarity, and not limitation, one of each of the components is shown in FIG. 1.

The processor subsystem 4 can include any processing circuitry operative to control the operations and performance of the system 2. In various aspects, the processor subsystem 4 can be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also can be implemented by a controller, a microcontroller, an application specific integrated circuit (ASIC), a field programmable gate array (FPGA), a programmable logic device (PLD), and so forth.

In various aspects, the processor subsystem 4 can be arranged to run an operating system (OS) and various applications. Examples of an OS comprise, for example, operating systems generally known under the trade name of Apple OS, Microsoft Windows OS, Android OS, Linux OS, and any other proprietary or open-source OS. Examples of applications comprise, for example, network applications, local applications, data input/output applications, user interaction applications, etc.

In some embodiments, the system 2 can include a system bus 12 that couples various system components including the processor subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCM-CIA), Small Computers Interface (SCSI) or other proprietary bus, or any custom bus suitable for computing device applications.

In some embodiments, the input/output subsystem 6 can include any suitable mechanism or component to enable a user to provide input to system 2 and the system 2 to provide output to the user. For example, the input/output subsystem 6 can include any suitable input mechanism, including but not limited to, a button, keypad, keyboard, click wheel, touch screen, motion sensor, microphone, camera, etc.

In some embodiments, the input/output subsystem 6 can include a visual peripheral output device for providing a display visible to the user. For example, the visual peripheral output device can include a screen such as, for example, a Liquid Crystal Display (LCD) screen. As another example, the visual peripheral output device can include a movable display or projecting system for providing a display of content on a surface remote from the system 2. In some embodiments, the visual peripheral output device can include a coder/decoder, also known as Codecs, to convert digital media data into analog signals. For example, the visual peripheral output device can include video Codecs, audio Codecs, or any other suitable type of Codec.

The visual peripheral output device can include display drivers, circuitry for driving display drivers, or both. The visual peripheral output device can be operative to display content under the direction of the processor subsystem 4. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 can include any suitable hardware, software, or combination of hardware and software that is capable of coupling the system 2 to one or more networks and/or additional devices. The communications interface 10 can be arranged to operate with any suitable technique for controlling information signals using a desired set of communications protocols, services, or operating procedures. The communications interface 10 can include the appropriate physical connectors to connect with a corresponding communications medium, whether wired or wireless.

Vehicles of communication comprise a network. In various aspects, the network can include local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules can communicate in accordance with a number of wired protocols. Examples of wired protocols can include Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 can include one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 can include a wireless interface comprising one or more antennas, transmitters, receivers, transceivers, amplifiers, filters, control logic, and so forth.

In various aspects, the communications interface 10 can provide data communications functionality in accordance with a number of protocols. Examples of protocols can include various wireless local area network (WLAN) protocols, including the Institute of Electrical and Electronics Engineers (IEEE) 802.xx series of protocols, such as IEEE 802.11a/b/g/n/ac/ax/be, IEEE 802.16, IEEE 802.20, and so forth. Other examples of wireless protocols can include various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, the Wi-Fi series of protocols including Wi-Fi Legacy, Wi-Fi 1/2/3/4/5/6/6E, and so forth. Further examples of wireless protocols can include wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols can include near-field communication techniques and protocols, such as electromagnetic induction (EMI) techniques. An example of EMI techniques can include passive or active radio-frequency identification (RFID) protocols and devices. Other suitable protocols can include Ultra-Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 can include any machine-readable or computer-readable media capable of storing data, including both volatile/non-volatile memory and removable/non-removable memory. The memory subsystem 8 can include at least one non-volatile memory unit. The non-volatile memory unit is capable of storing one or more software programs. The software programs can contain, for example, applications, user data, device data, and/or configuration data, or combinations therefore, to name only a few. The software programs can contain instructions executable by the various components of the system 2.

In various aspects, the memory subsystem 8 can include any machine-readable or computer-readable media capable of storing data, including both volatile/non-volatile memory and removable/non-removable memory. For example, memory can include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 can contain an instruction set, in the form of a file for executing various methods, such as methods for generating keyword-responsive content elements, as described herein. The instruction set can be stored in any acceptable form of machine-readable instructions, including source code or various appropriate programming languages. Some examples of programming languages that can be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processor subsystem 4.

Figure 2:
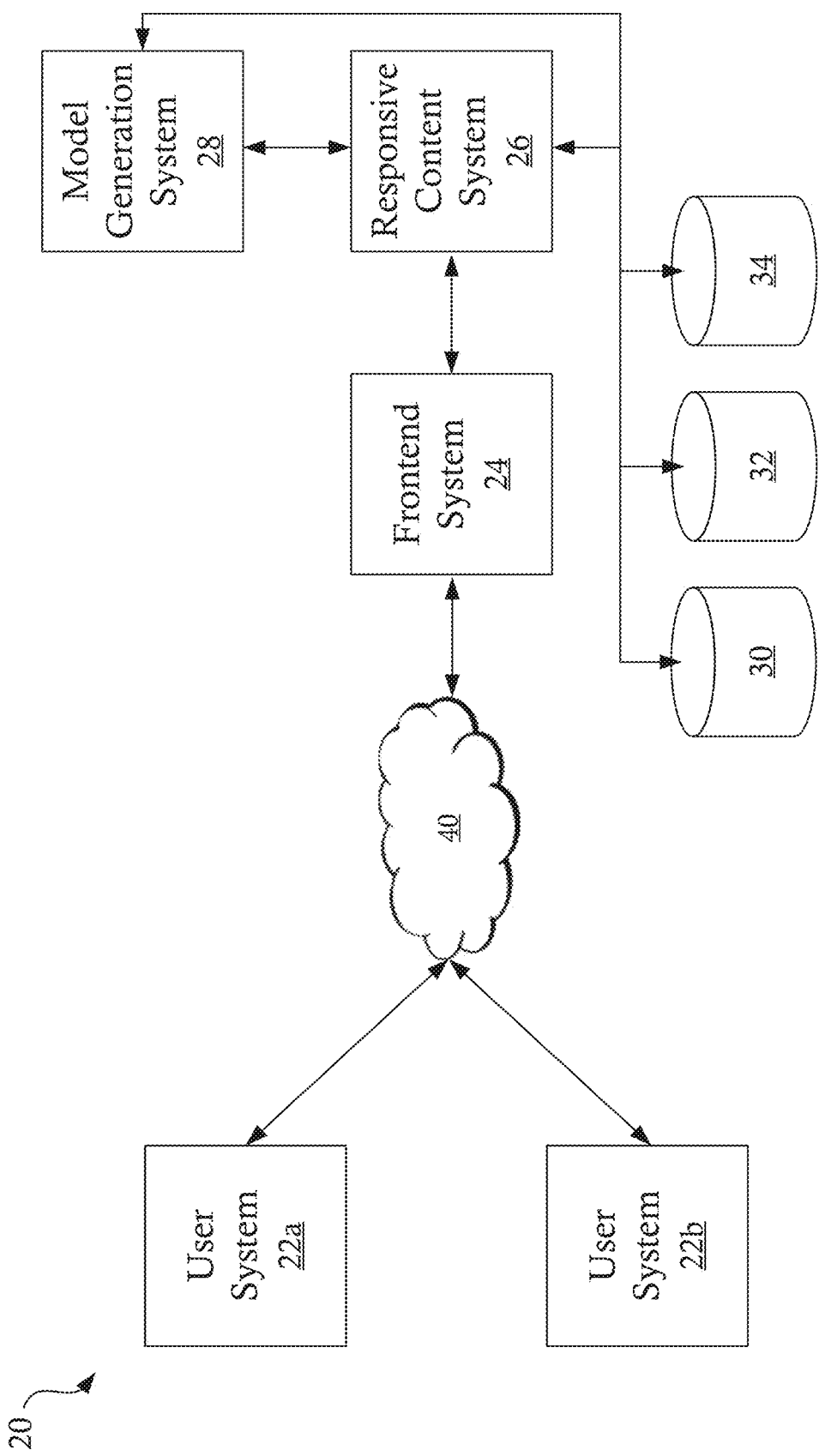
FIG. 2 illustrates a network environment configured to generate responsive textual descriptions and provide a search interface including responsive textual descriptions, in accordance with some embodiments.

FIG. 2 illustrates a network environment 20 configured to generate keyword-responsive content elements and/or provide an interface including keyword-responsive content elements, in accordance with some embodiments. The network environment 20 includes a plurality of systems configured to communicate over one or more network channels, illustrated as network cloud 40. For example, in various embodiments, the network environment 20 can include, but is not limited to, one or more remote systems 22a, 22b, a frontend system 24, a responsive content system 26, a model generation system 28, a keyword database 30, a category database 32, a model store database 34, and/or any other suitable system. It will be appreciated that any of the illustrated systems can include a system as described above in conjunction with FIG. 1. Although specific embodiments are discussed, herein it will be appreciated that additional systems, servers, storage mechanism, etc. can be included within the network environment 20.

Further, although embodiments are illustrated herein having individual, discrete systems, it will be appreciated that, in some embodiments, one or more systems can be combined into a single logical and/or physical system. For example, in various embodiments, the frontend system 24, the responsive content system 26, the model generation system 28, the keyword database 30, the category database 32, and/or the model store database 34 can be combined into a single logical and/or physical system. Similarly, although embodiments are illustrated having a single instance of each system, it will be appreciated that additional instances of a system can be implemented within the network environment 20. In some embodiments, two or more systems can be operated on shared hardware in which each system operates as a separate, discrete system utilizing the shared hardware, for example, according to one or more virtualization schemes.

In various embodiments, one or more remote systems 22a, 22b include systems operable to request or access a network interface provided by one or more additional systems, such as the frontend system 24 and/or an additional remote system 22a, 22b. The network interface can include any suitable network-based interface, such as a webpage, intranet page, application interface, etc. Examples of network interfaces include, but are not limited to, search interfaces, e-commerce interfaces, browsing interfaces, etc. A remote system 22a, 22b can request an interface including content related to one or more keywords. Remote systems can include any suitable system, such as a home computer, mobile device, virtual device, server, etc.

In some embodiments, a frontend system 24 includes an interface generation engine configured to provide a network interface, such as a webpage, to one or more remote systems 22a, 22b. For example, in some embodiments, the frontend system 24 is configured to generate a search engine interface, such as a search page or network page including a search function. The search engine interface is configured to receive a search query from a remote system 22a, 22b including one or more keywords defining a search query.

The frontend system 24 is configured to provide a second interface, such as a search result interface, including electronic data elements selected from a catalog associated with the frontend system 24 based on the search query. The catalog can include any suitable electronic data elements, such as, for example, interface pages, representations of items (e.g., a product catalog), database entries, and/or any other suitable electronic data elements. The second interface page includes interface elements, such as links, for accessing additional interface pages including detailed information on the represented electronic data elements. The second interface page can include textual content configured to assist a user in navigating or identifying search results within the second interface. For example, the second interface page can include titles and/or descriptions of the included electronic data elements providing identifying information and/or contextual information related to the search results.

In some embodiments, the textual content includes keyword-responsive content generated and/or selected in response to one or more keywords included in the interface request, for example, one or more keywords included in a search query. For example, a responsive content system 26 can be configured to receive one or more keywords and generate keyword-responsive content. The responsive content system 26 can include one or more trained models configured to classify and/or categorize keywords or portions of keywords. Responsive-content templates and content elements are selected based on the classified and/or categorized portions of the keywords. In some embodiments, a responsive content system 26 includes a keyword categorization engine including one or more trained models, such as a trained classification model configured to classify a keyword as one of a catalog-related keyword or an unrelated keyword, a trained lineage categorization model configured to classify a keyword in one of a plurality of lineages associated with a catalog, and/or a trained facet recognition module configured to classify terms or portions of a keyword into one of a plurality of facets associated with a selected lineage.

In some embodiments, one or more of the trained classification model, the trained lineage categorization model, and/or the trained facet recognition module are generated by a model generation system 28. The model generation system 28 is configured to generate one or more trained models using an iterative training process, as discussed in greater detail below. The model generation system 28 can be configured to deploy trained models directly to a system, such as the responsive content system 26, and/or can be configured to store trained models in a model datastore, such as model store database 34.

In various embodiments, the system or components thereof can comprise or include various modules or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the examples herein.

Figure 3:
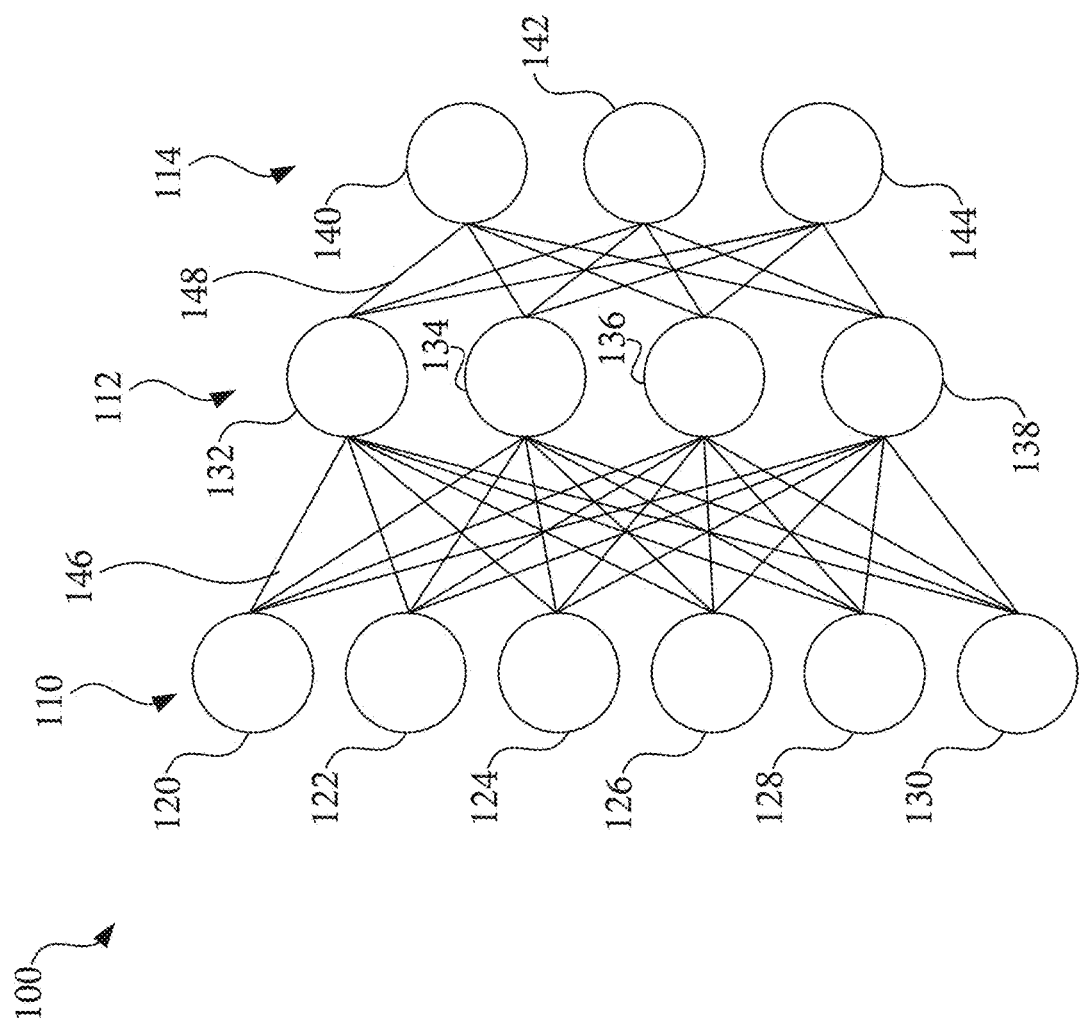
FIG. 3 illustrates an artificial neural network, in accordance with some embodiments.

FIG. 3 illustrates an artificial neural network 100, in accordance with some embodiments. Alternative terms for "artificial neural network" are "neural network," "artificial neural net," "neural net," or "trained function." The neural network 100 comprises nodes 120-144 and edges 146-148, wherein each edge 146-148 is a directed connection from a first node 120-138 to a second node 132-144. In general, the first node 120-138 and the second node 132-144 are different nodes, although it is also possible that the first node 120-138 and the second node 132-144 are identical. For example, in FIG. 3 the edge 146 is a directed connection from the node 120 to the node 132, and the edge 148 is a directed connection from the node 132 to the node 140. An edge 146-148 from a first node 120-138 to a second node 132-144 is also denoted as "ingoing edge" for the second node 132-144 and as "outgoing edge" for the first node 120-138.

The nodes 120-144 of the neural network 100 can be arranged in layers 110-114, wherein the layers can comprise an intrinsic order introduced by the edges 146-148 between the nodes 120-144. In particular, edges 146-148 can exist only between neighboring layers of nodes. In the illustrated embodiment, there is an input layer 110 comprising only nodes 120-130 without an incoming edge, an output layer 114 comprising only nodes 140-144 without outgoing edges, and a hidden layer 112 in-between the input layer 110 and the output layer 114. In general, the number of hidden layer 112 can be chosen arbitrarily and/or through training. The number of nodes 120-130 within the input layer 110 usually relates to the number of input values of the neural network, and the number of nodes 140-144 within the output layer 114 usually relates to the number of output values of the neural network.

In particular, a (real) number can be assigned as a value to every node 120-144 of the neural network 100. Here, $x_i^{(n)}$ denotes the value of the i-th node 120-144 of the n-th layer 110-114. The values of the nodes 120-130 of the input layer 110 are equivalent to the input values of the neural network 100, the values of the nodes 140-144 of the output layer 114 are equivalent to the output value of the neural network 100. Furthermore, each edge 146-148 can comprise a weight being a real number, in particular, the weight is a real number within the interval [−1, 1], within the interval [0, 1], and/or within any other suitable interval. Here, $w_{i,j}^{(m,n)}$ denotes the weight of the edge between the i-th node 120-138 of the m-th layer 110, 112 and the j-th node 132-144 of the n-th layer 112, 114. Furthermore, the abbreviation $w_{i,j}^{(n)}$ defined for the weight $w_{i,j}^{(n,n+1)}$.

In particular, to calculate the output values of the neural network 100, the input values are propagated through the neural network. In particular, the values of the nodes 132-144 of the (n+1)-th layer 112, 114 can be calculated based on the values of the nodes 120-138 of the n-th layer 110, 112 by $$x_j^{(n+1)} = f(\Sigma_i x_i^{(n)} \cdot w_{i,j}^{(n)})$$

Herein, the function f is a transfer function (another term is "activation function"). Known transfer functions are step functions, sigmoid function (e.g., the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the hidden layer(s) 112 can be calculated based on the values of the input layer 110 of the neural network and/or based on the values of a prior hidden layer, etc.

In order to set the values $w_{i,j}^{(m,n)}$ for the edges, the neural network 100 has to be trained using training data. In particular, training data comprises training input data and training output data. For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to $$w'^{(n)}_{i,j} = w_{i,j}^{(n)} - \gamma \cdot \delta_j^{(n)} \cdot x_i^{(n)}$$

wherein $\gamma$ is a learning rate, and the numbers $\delta_j^{(n)}$ can be recursively calculated as $$\delta_j^{(n)} = (\Sigma_k \delta_k^{(n+1)} \cdot w_{j,k}^{(n+1)}) \cdot f'(\Sigma_i x_i^{(n)} \cdot w_{i,j}^{(n)})$$

based on $\delta_j^{(n+1)}$, if the (n+1)-th layer is not the output layer, and $$\delta_j^{(n)} = (x_k^{(n+1)} - t_j^{(n+1)}) \cdot f'(\Sigma_i x_i^{(n)} \cdot w_{i,j}^{(n)})$$

if the (n+1)-th layer is the output layer 114, wherein f' is the first derivative of the activation function, and $y_j^{(n+1)}$ is the comparison training value for the j-th node of the output layer 114.

Figure 4:
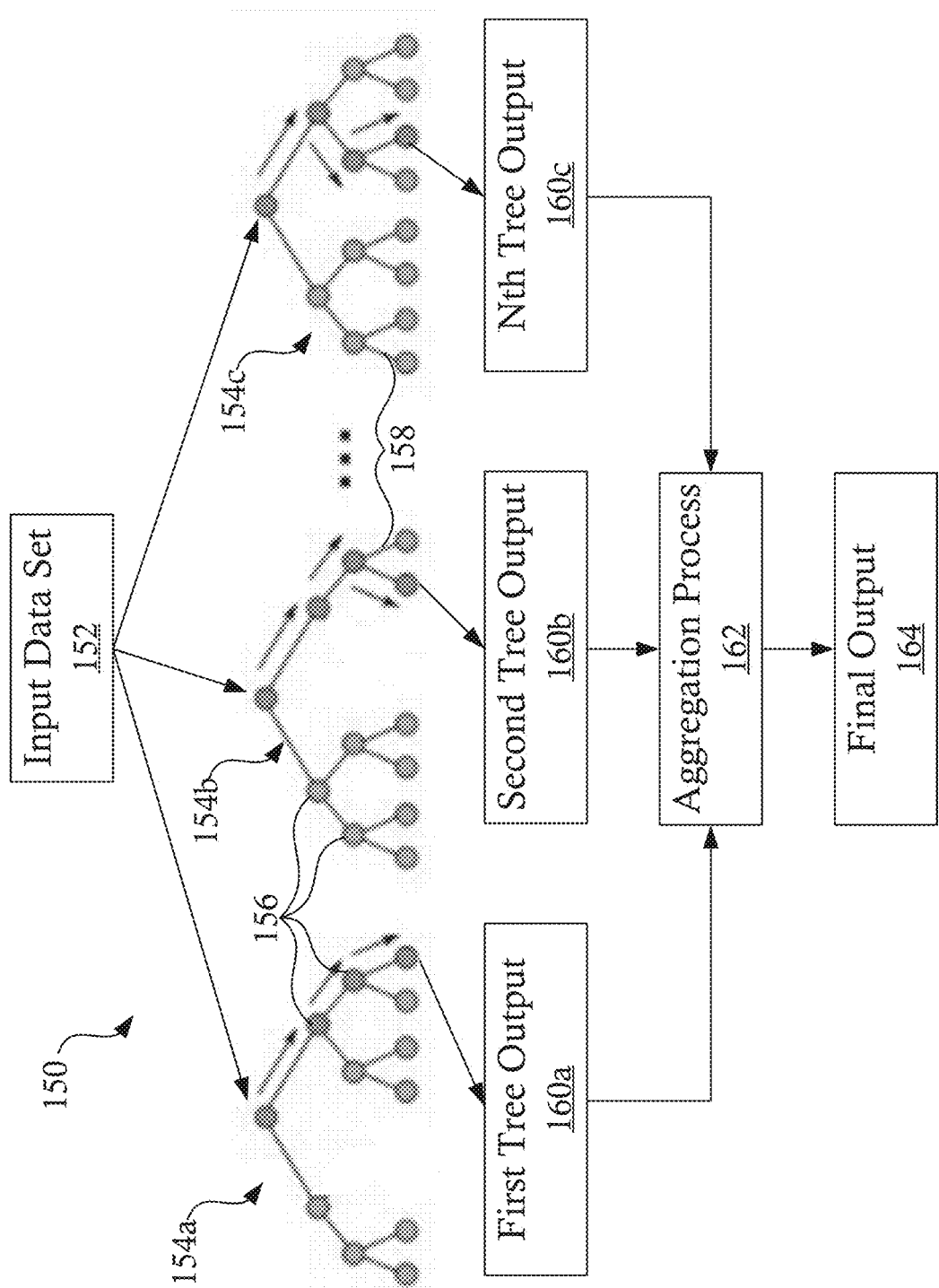
FIG. 4 illustrates a tree-based neural network, in accordance with some embodiments.

FIG. 4 illustrates a tree-based neural network 150, in accordance with some embodiments. In particular, the tree-based neural network 150 is a random forest neural network, though it will be appreciated that the discussion herein is applicable to other decision tree neural networks. The tree-based neural network 150 includes a plurality of trained decision trees 154a-154c each including a set of nodes 156 (also referred to as "leaves") and a set of edges 158 (also referred to as "branches").

Each of the trained decision trees 154a-154c can include a classification and/or a regression tree (CART). Classification trees include a tree model in which a target variable can take a discrete set of values, e.g., can be classified as one of a set of values. In classification trees, each leaf 156 represents class labels and each of the branches 158 represents conjunctions of features that connect the class labels. Regression trees include a tree model in which the target variable can take continuous values (e.g., a real number value).

In operation, an input data set 152 including one or more features or attributes is received. A subset of the input data set 152 is provided to each of the trained decision trees 154a-154c. The subset can include a portion of and/or all of the features or attributes included in the input data set 152. Each of the trained decision trees 154a-154c is trained to receive the subset of the input data set 152 and generate a tree output value 160a-160c, such as a classification or regression output. The individual tree output value 160a-160c is determined by traversing the trained decision trees 154a-154c to arrive at a final leaf (or node) 156.

In some embodiments, the tree-based neural network 150 applies an aggregation process 162 to combine the output of each of the trained decision trees 154a-154c into a final output 164. For example, in embodiments including classification trees, the tree-based neural network 150 can apply a majority-voting process to identify a classification selected by the majority of the trained decision trees 154a-154c. As another example, in embodiments including regression trees, the tree-based neural network 150 can apply an average, mean, and/or other mathematical process to generate a composite output of the trained decision trees. The final output 164 is provided as an output of the tree-based neural network 150.

Figure 5:
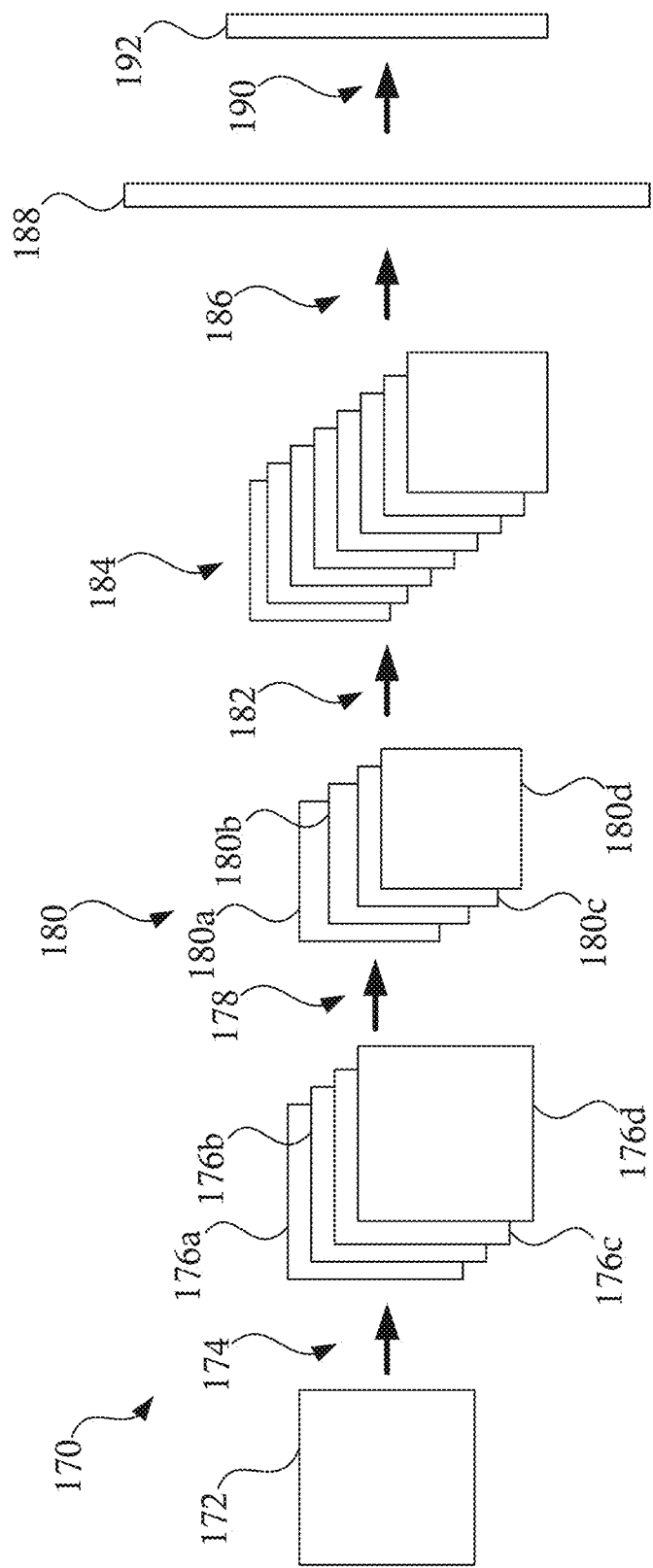
FIG. 5 illustrates a convolutional neural network, in accordance with some embodiments.

FIG. 5 illustrates a convolutional neural network (CNN) 170 including an input layer 172, a plurality of hidden layers, and an output layer 192, in accordance with some embodiments. The CNN 170 includes an input layer 172 configured to receive an input. The input includes a tensor having a shape, e.g., a set number of inputs, an input height, input width, and input channels. One or more first convolutions 174 are applied to the input layer 172 to generate a set of feature maps 176a-176d. Feature maps 176a-176d, also referred to as activation maps, include a shape having a number of inputs, a feature map height, a feature map width, and feature map channels.

After generating the set of feature maps 176a-176d, the CNN 170 implements subsampling 178 of the set of feature maps 176a-176d to generate smaller feature maps 180a-180d, e.g., to generate a pooling layer 180. A second convolution 182 is applied to the pooling layer 180 to generate additional feature maps 184. It will be appreciated that any number of additional convolutions or subsampling can be applied to generate any additional number of feature maps or pooling layers.

The feature maps 184 are mapped 186 to a fully connected layer 188 and the fully connected layer 188 is mapped 190 to an output layer 192. The fully connected layer 188 includes a layer in which every neuron in a first layer, e.g., the feature map layer 184, is connected to a neuron in another layer, e.g., the fully connected layer 188. In some embodiments, the fully connected layer 188 is similar to a traditional multilayer perceptron neural network.

Figure 6:
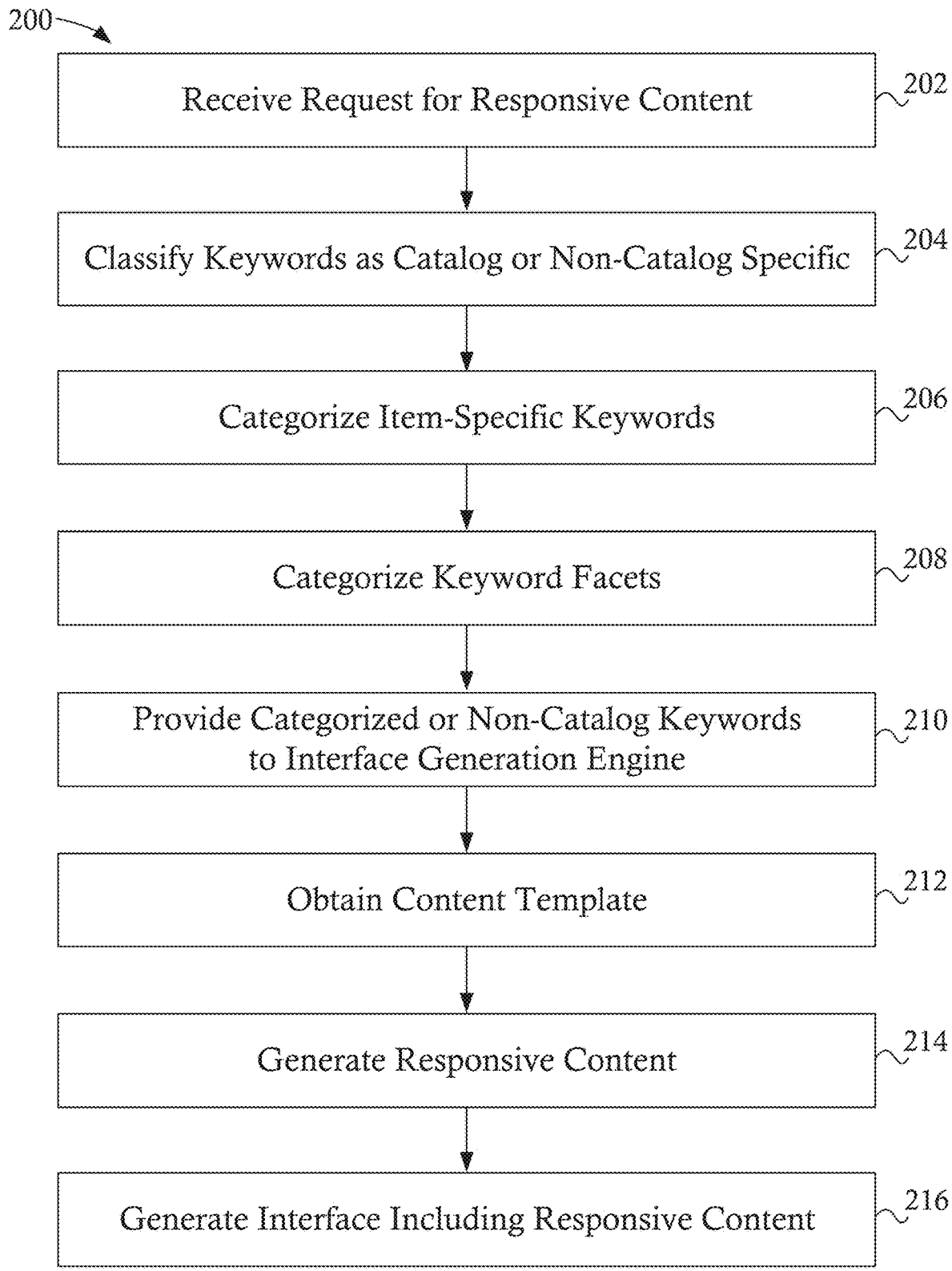
FIG. 6 is a flowchart illustrating a method of generating keyword-responsive content elements, in accordance with some embodiments.
Figure 7:
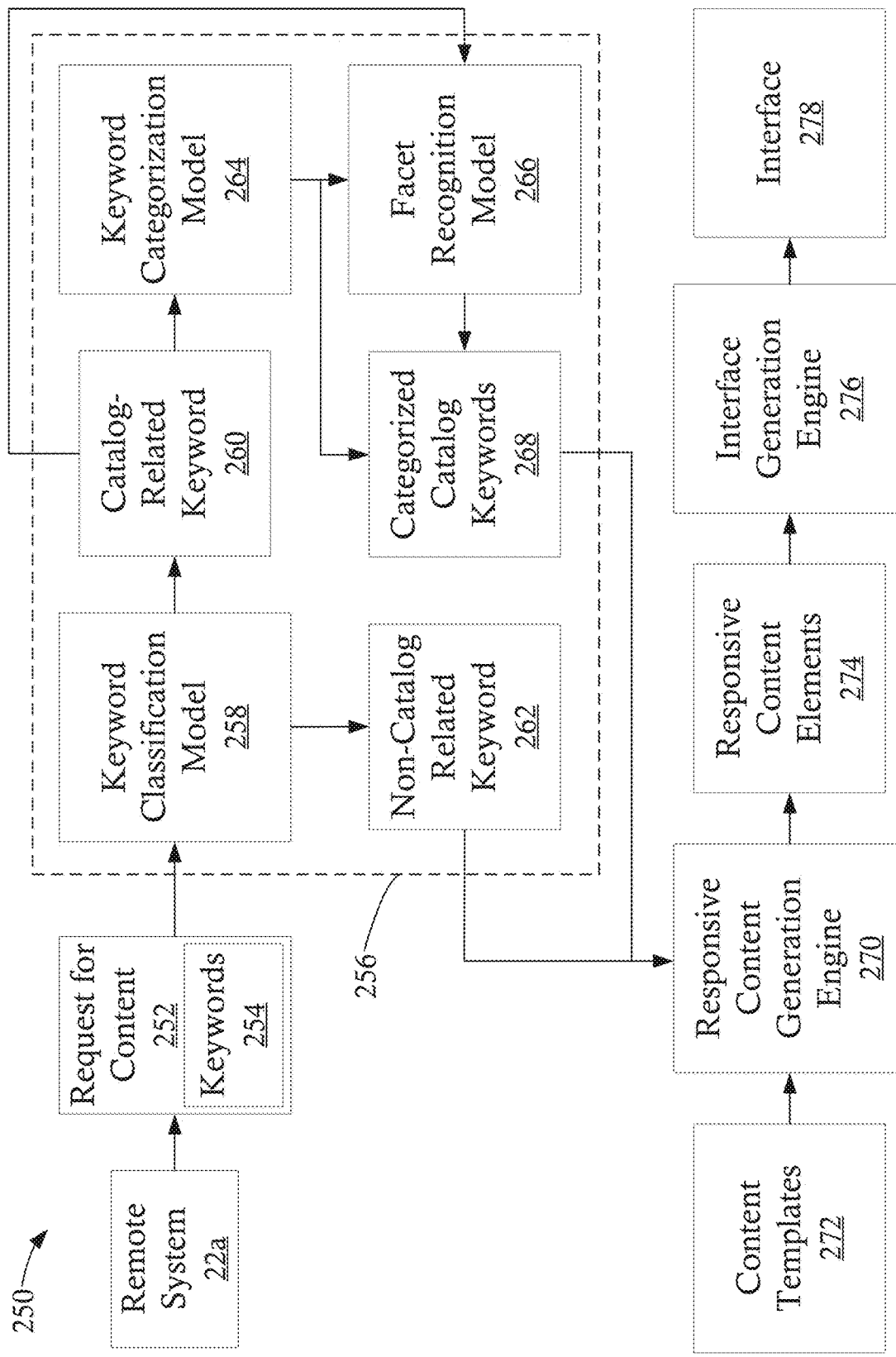
FIG. 7 is a process flow illustrating various steps of the method of generating keyword-responsive content elements, in accordance with some embodiments.

FIG. 6 is a flowchart illustrating a method 200 of generating keyword-responsive content elements, in accordance with some embodiments. FIG. 7 is a process flow 250 illustrating various steps of the method of generating keyword-responsive content elements, in accordance with some embodiments. At step 202, a request for related content 252 is received. The request for related content 252 includes a request for interface elements and/or an interface page including content related to one or more keywords 254. For example, in some embodiments, the request for related content 252 is a request for a search interface including search results for a one or more keywords, e.g., a search query. As another example, in some embodiments, the request for related content 252 is a request for item-specific content for populating a third party interface, such as a request from a remote webserver for descriptive content to populate a third-party search interface.

The request for related content 252 includes one or more keywords 254. The one or more keywords can include any suitable keywords, such as, for example, a search query, a content category, an item name or description, etc. The one or more keywords 254 can include textual content including multiple terms and/or phrases. For example, in some embodiments, a search query can include a search for "red women's 2 inch heel shoes." Each term and/or phrase in the search query can be considered a separate keyword, the search query can be considered a single keyword with subparts, and/or a combination of both. Although embodiments are discussed herein including textual keywords, it will be appreciated keywords can also include numeric and/or alphanumeric strings. The one or more keywords 254 can be received by a keyword classification engine 256 configured to categorize keywords 254, as discussed in greater detail below.

At step 204, the one or more keywords 254 are classified into one of two categories, e.g., catalog related or non-catalog related keywords. Catalog related keywords can include keywords that are relevant to one or more elements included in a catalog. For example, in embodiments including a catalog of items associated with an interface, the catalog-relevant keywords include keywords that describe or reference the individual items in the catalog and/or attributes of the items in the catalog. As another example, in embodiments including a catalog of interface pages, the catalog-relevant keywords can include keywords that appear on and/or are related to content included within each of the interface pages in the catalog. Similarly, non-catalog relevant keywords are keywords that are not specifically relevant to elements of the catalog. For example, non-catalog relevant keywords can include descriptors related to a platform as a whole, elements of a platform other than the catalog, and/or generic keywords.

In some embodiments, the one or more keywords are classified by a keyword classification model 258 implemented by a keyword classification engine 256. The keyword classification model 258 can include any suitable trained classification model configured to classify keywords 254 as catalog related keywords 260 or non-catalog related keywords 262. In some embodiments, a keyword classification model 258 includes a Bidirectional Encoder Representations from Transformers (BERT) model, as illustrated in FIG. 8.

Figure 8:
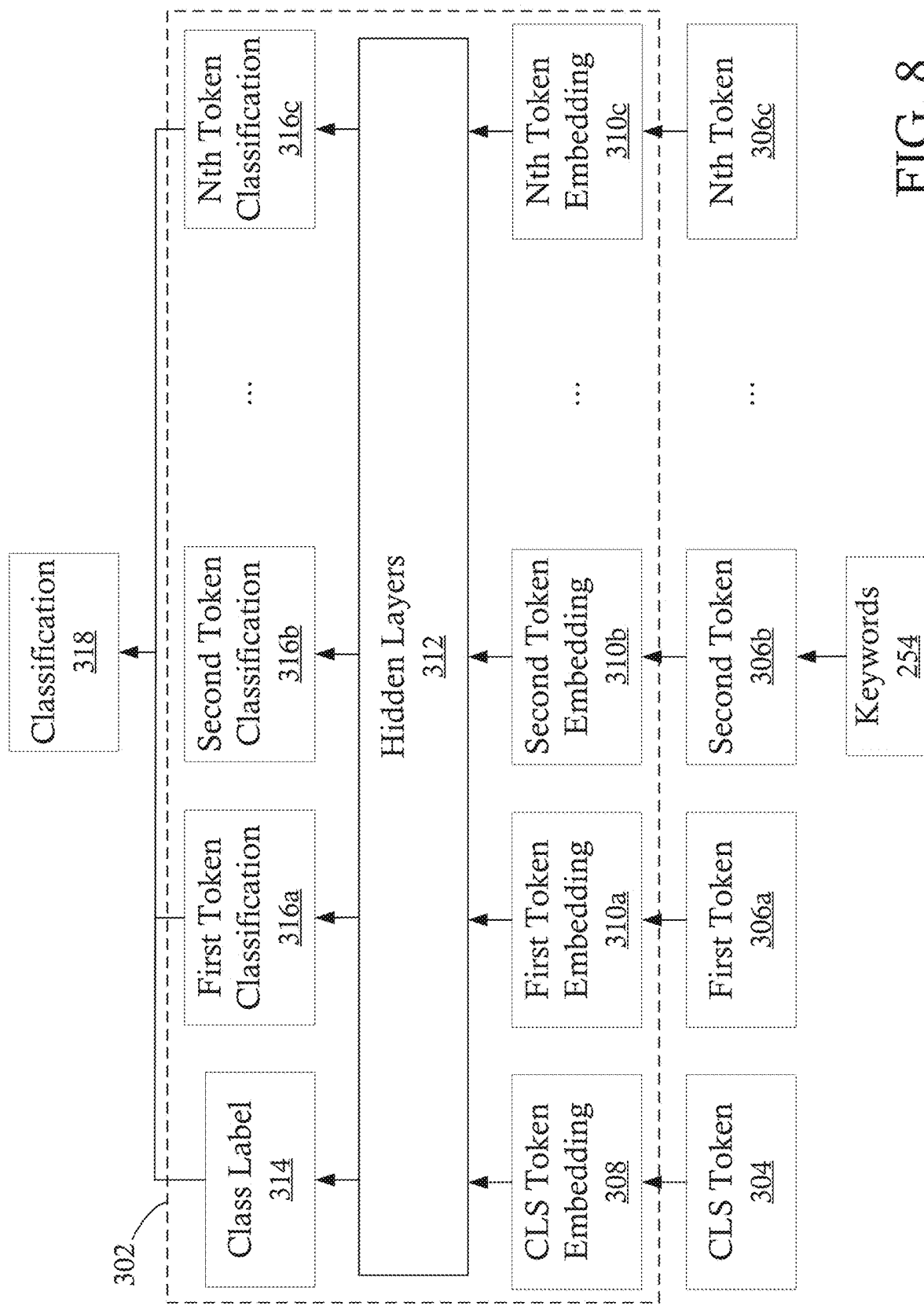
FIG. 8 illustrates a trained binary classification model configured to identify product-specific keywords, in accordance with some embodiments.

As shown in FIG. 8, a BERT model 302 is configured to receive a plurality of tokens including a class token 304 and a set of keyword tokens 306a-306c. The set of keyword tokens 306a-306c are derived from the keywords 254. In some embodiments, each token 306a-306c represents a term or phrase extracted from the keyword 254. For example, if a keyword including "red women's 2 inch heel shoes" is received, each token 306a-306c can represent a term or phrase included in the keyword, such as "red," "women's," "2 inch," "heel," "shoes," and/or a combination thereof.

The BERT model 302 is configured to receive a class token 304 and a plurality of keyword tokens 306a-306c. The class embedding 308 and the token embeddings 310a-310c include vector-space representations of the received tokens 304, 306a-306c. For example, in some embodiments, the token embeddings 310a-310c include vector-space representations of terms or phrases included in the keywords 260. As another example, in some embodiments, the class embedding 308 includes a vector-space representation of the potential classifications of the keywords, e.g., vector-space representations of catalog-relevant or non-catalog relevant.

In some embodiments, the BERT model 302 generates a class embedding 308 and a plurality of token embeddings 310a-310c. For example, the BERT model 302 can include one or more embedding generation layers or sub-models configured to generate class embeddings 308 and/or token embeddings 310a-310c. In some embodiments, the BERT model 302 receives pre-generated embeddings, for example, from a separate embedding generation model and/or from an embedding store, such as a category database 32. The token embeddings 310a-310c can be generated using any suitable embedding generation process and/or layer. For example, in some embodiments, the BERT model 302 includes a one or more layers or sub-models, such as a word2vec model, configured to convert tokens 304, 306a-306c to embeddings 308, 310a-310c.

The BERT model 302 includes a plurality of hidden layers 312 configured to classify the token embeddings 310a-310c into one of a plurality of classifications 316a-316c. The classifications 316a-316c can be defined by class labels 314 generated based on the class embedding 308. In some embodiments, a catalog includes a plurality of categories. Each of the categories includes a subset of the elements available in the catalog. For example, in the context of an e-commerce item catalog, the categories can include departments, sub-departments, and/or other item-relevant divisions. As another example, in the context of a webpage catalog, the categories can include subject matter categories, content categories, and/or other relevant categories. It will be appreciated that any number or type of categories can be defined for a catalog.

In some embodiments, the class label 314 and the token classifications 316a-316c are combined to generate an output classification 318 of the keywords 254. For example, in some embodiments, the output classification 318 can include classification of the keywords 254 as one of a catalog relevant or non-catalog relevant keyword. The output classification 318 can include a textual output, e.g., the name of the classification, a numerical output, e.g., a number (0, 1, etc.) corresponding to the classification category, a probability of classification in one of the potential categories, and/or any other suitable output.

With reference again to FIGS. 6 and 7, the keyword classification model 258 identifies the keywords 254 as either catalog related keywords 260 or a non-catalog related keywords 262. When the keyword classification model 258 classifies the keywords 254 as non-catalog related keywords 262, the method 200 proceeds to 210, discussed in more detail below. When the keyword classification model 258 classifies the keywords 254 as catalog related keywords 260, the method 200 proceeds to step 206.

At step 206, the catalog related keywords 260 are categorized into one of a plurality of categories associated with the catalog. For example, in the context of an e-commerce environment, the catalog can include a plurality of items with each item being associated with a department or item type, e.g., sporting goods, grocery, men's clothing, women's clothing, seasonal, etc. The catalog related keywords 260 can be characterized into one of the departments or item types defined for the catalog of items. For example, to continue the prior example, a search for "red women's 2 inch heel shoes" can be categorized into a "shoe" or "dress shoe" category within a catalog of items. As another example, in the context of a catalog of webpages, the webpages in the catalog can be divided by subject matter, page type, and/or any other suitable delineation and the catalog related keywords 260 are categorized into one of the defined delineations related to the webpage catalog.

In some embodiments, the catalog related keywords 260 are categorized by a keyword categorization model 264. The keyword categorization model 264 can include any suitable trained categorization model configured to categorize catalog related keywords 260 into one of a set of defined categories associated with a catalog. In some embodiments, a keyword categorization model 264 includes a trained semantic similarity categorization model configured to categorize product-specific keywords, such as a two-tower semantic categorization model 350, as illustrated in FIG. 9.

Figure 9:
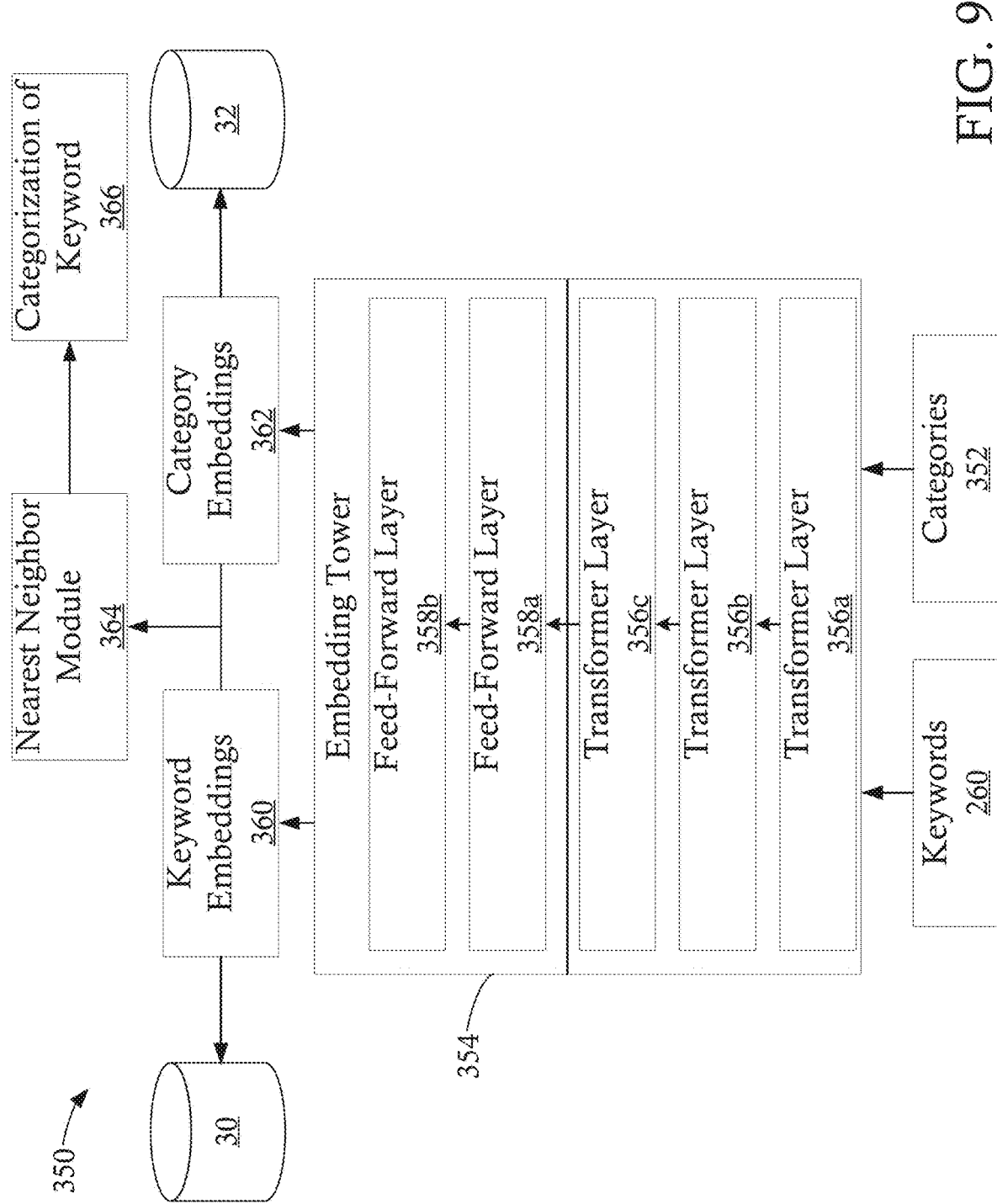
FIG. 9 illustrates a trained semantic similarity categorization model configured to categorize product-specific keywords, in accordance with some embodiments.

As shown in FIG. 9, in some embodiments, a trained semantic similarity categorization model includes a two-tower semantic categorization model 350. The two-tower semantic categorization model 350 includes at least one embedding tower 354 (or stack) configured to receive catalog related keywords 260 and categories 352. Each of the catalog related keywords 260 and the category 352 are independently processed by the embedding tower 354 to generate keyword embeddings 360 and category embeddings 362, respectively. In some embodiments, the at least one embedding tower 354 includes a plurality of transformer layers 356a-356c and a plurality of feed-forward layers 358a-358b. Although embodiments are illustrated including a single embedding tower 354, it will be appreciated that the two-tower semantic categorization model 350 can include multiple copies of the embedding tower 354, each one configured to generate one of a keyword embedding 360 or a category embedding 362.

In some embodiments, the keyword embeddings 360 and/or the category embeddings 362 are stored in respective databases after being generated by the at least one embedding tower 354. For example, as shown in FIG. 9, in some embodiments, the keyword embeddings 360 can be stored in a keyword database 30 and the category embeddings 362 can be stored in a category database 32. In some embodiments, certain embeddings, such as category embeddings 362, can be pre-generated prior to receiving the catalog related keyword 260 and/or generating the keyword embeddings 360. For example, a two-tower semantic categorization model 350 can be deployed and operated as a background or batch process to generate category embeddings 362 for each category 352 in an associated catalog. The generated category embeddings 362 are stored in a database, such as a category database 32. Subsequently, a catalog related keyword 260 can be received and the keyword embedding 360 can be generated in real time by the embedding tower 354. Alternatively, generation of both keyword embeddings 360 and category embeddings 362 can be performed as background or batch processes and generated embeddings stored for future retrieval. Although specific embodiments are discussed herein, it will be appreciated that any portion of the disclosed systems and methods can be operated as real time, near-real time, and/or background/batch processes.

After generating the keyword embeddings 360 and the category embeddings 362, the two-tower semantic categorization model 350 performs a nearest neighbor determination for the keyword embeddings 360. For example, in some embodiments, a nearest neighbor module 364 is configured to determine a nearest neighbor for a generated keyword embedding 360. A nearest neighbor can be determined by calculating a pairwise distance between a keyword embedding 360 and each of the category embeddings 362. The category embeddings 362 having the smallest, or shortest, pairwise distance with respect to the keyword embedding 360 is the nearest neighbor. The two-tower semantic categorization model 350 outputs a category 366 that is associated with the nearest neighbor category embedding 362.

With reference again to FIGS. 6-7, at step 208, terms within the catalog related keywords 260 are categorized into (e.g., identified as) one of a plurality of facet categories associated with the catalog and/or a specific category within the catalog. For example, in the context of an e-commerce environment, the catalog can include a plurality of items with each item being associated with general catalog facets, e.g., brand, item type, etc. and/or category specific facets, e.g., color, size, brand, sub-category, etc. To continue the prior example, the individual terms in the search for "red women's 2 inch heel shoes" can be categorized as "Color: red," "Sub-Category: Woman's," "Size: 2 inch," etc. As another example, in the context of a catalog of webpages, the webpages in the catalog can include page-specific facets, such as language, available functions, domains, etc. It will be appreciated that any suitable facets can be defined for a catalog or a portion of a catalog.

In some embodiments, the terms within the catalog related keywords 260 are categorized by a facet recognition model 266. The facet recognition model 266 can include any suitable trained categorization model configured to identify terms of the catalog related keywords 260 as being associated with one of a plurality of features associated with a catalog and/or a category within a catalog. In some embodiments, a facet recognition model 266 includes a trained question-answering (QA) model configured to associated individual terms within the catalog related keywords 260 with features of the catalog.

Figure 10:
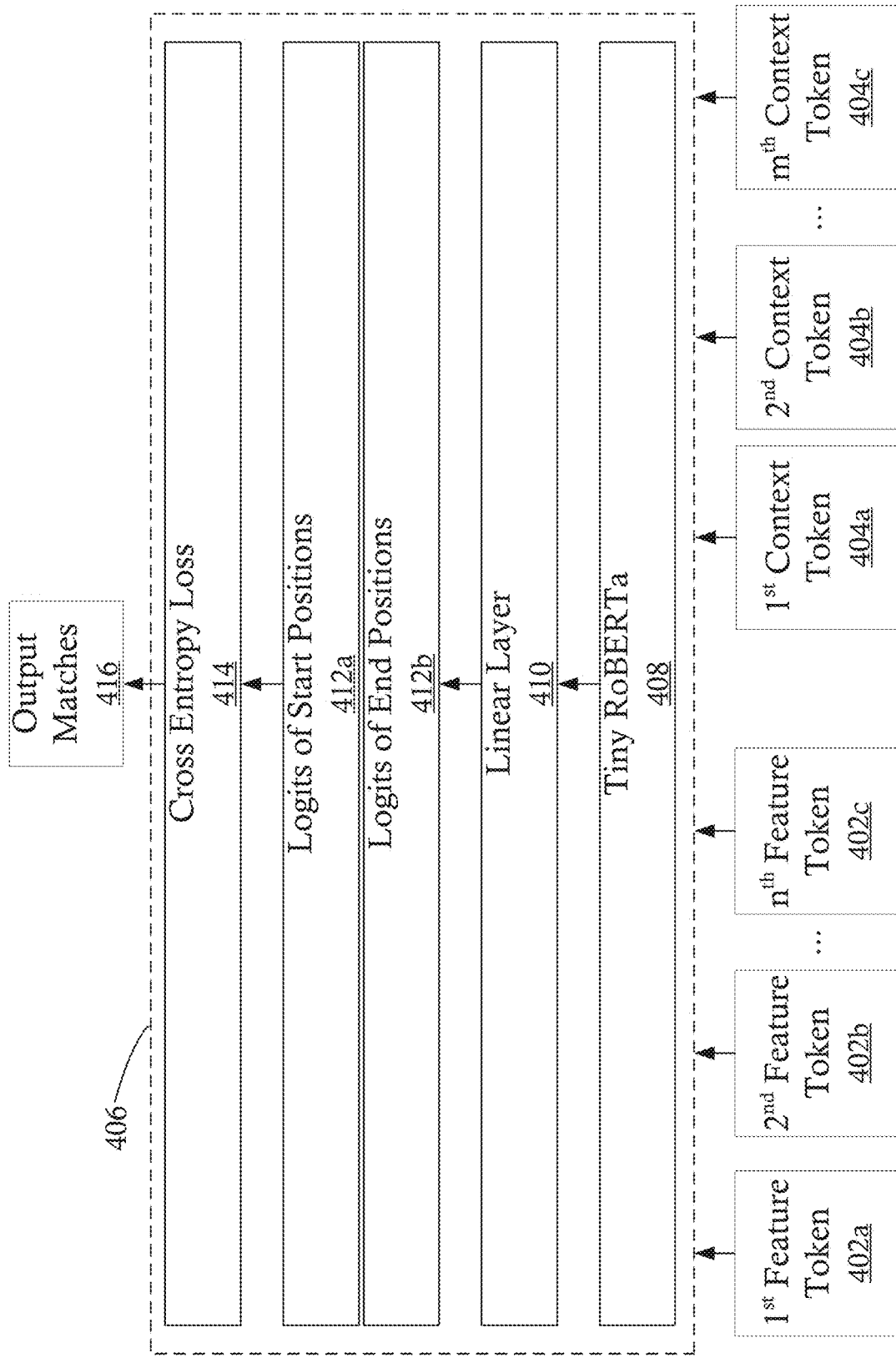
FIG. 10 illustrates a trained feature recognition model configured to identify item features, in accordance with some embodiments.

As shown in FIG. 10, a trained facet recognition model can include a QA model 406 including a tiny Robustly Optimized BERT Approach (RoBERTa) layer 408, a linear layer 410, and a cross entropy loss layer 414. The QA model 406 is configured to receive a set of feature tokens 402a-402c and a set of context tokens 404a-404c. The set of feature tokens 402a-402c represent the features, e.g., terms, extracted from the catalog related keywords 260 and the set of context tokens 404a-404c represent a knowledge base configured to provide answers to questions within the QA model 406. With respect to the QA model 406, the feature tokens 402a-402c represent the questions and the context tokens 404a-404c represent possible answers, or references, for the questions. Although embodiments are illustrated including an extractive QA model 406, it will be appreciated that any suitable QA model, such as a open generative QA model or a closed generative QA model, can be used. In addition, although embodiments are illustrated including a closed-domain QA, e.g., a QA model including a set of context tokens 404a-404c, it will be appreciated that an open-domain QA can be used in some embodiments.

The QA model 406 includes a tiny RoBERTa layer 408 (or model). A RoBERTa model is similar to a BERT model, such as the BERT model 302 discussed above in conjunction with FIG. 8. A RoBERTa model includes a BERT model having a next-sentence pretraining objective removed and trained on a larger dataset as compared to a BERT model. In some embodiments, the tiny RoBERTa layer 408 is configured to receive untyped tokens 402a-402c, 404a-404c and implement a separation tokenizer. In general, a "tiny" model is a model optimized for deployment on systems and devices having less processing power and/or deployed to systems having higher processing power for shorter runtimes. Although embodiments are discussed herein including a tiny RoBERTa model 408, it will be appreciated that a regular RoBERTa model can be used in some embodiments.

The tiny RoBERTa layer 408 generates a plurality of classifications that are provided to a linear layer 410. The linear layer 410 can include one or more linear layers, such as one or more unbiased layers, one or more feedforward layers, and/or any other suitable linear layer. The linear layer 410 is configured to receive the classification outputs of the tiny RoBERTa layer 408, e.g., probability outputs, and apply linearization to generate logits, e.g., logits for a start position 412a and logits for an end position 412b.

The logits 412a, 412b are provided to a cross entropy loss layer 414. The cross entropy loss layer 414 is configured to generate a measure of the classification of the prior layers, e.g., the tiny RoBERTa layer 408 and/or the linear layer 410. In some embodiments, the cross entropy loss layer 414 can be applied as a regression layer and/or a cross entropy loss function. The output of the QA model 406 includes a categorization of the terms within catalog relevant keyword to facet categories of the catalog. For example, as discussed above, the individual terms in the search for "red women's 2 inch heel shoes" can be categorized as "Color: red," "Sub-Category: Woman's," and "Size: 2 inch."

With reference again to FIGS. 6-7, at step 210, the categorized catalog keywords 268 and/or the non-catalog related keywords 262 are provided to a responsive content generation engine 270 and, at step 212, a content template 272 is obtained based on the received keywords. In some embodiments, when a responsive content generation engine 270 receives categorized catalog keywords 268, the responsive content generation engine 270 is configured to obtain one or more templates based on the catalog categorization generated by the keyword categorization model 264, as discussed above. For example, if the keyword categorization model 264 determines a catalog category as "dress shoes," one or more content templates 272 associated with the "dress shoes" category can be obtained. In some embodiments, when non-catalog related keywords 262 are received, the responsive content generation engine 270 is configured to obtain content templates 272 associated with the catalog or platform, for example, default or generic content templates.

At step 214, the responsive content generation engine 270 generates one or more responsive content elements 274. In some embodiments, the responsive content elements 274 include textual content elements. The responsive content elements 274 can be generated by populating an obtained content template 272 with one or more terms associated with one or more predetermined facet categories. To continue the example from above, when the catalog category is "dress shoes," a content template 272 can be obtained for the "dress shoes" category that includes locations for insertion of various facet categories associated with the dress shoe catalog category, such as size, color, brand, etc.

In some embodiments, when non-catalog related keywords 262 are received, the responsive content element 274 includes a default or generic content element. For example, in embodiments including non-catalog related keywords 262, the keyword categorization model 264 does not generate a catalog category determination or feature category determinations, and thus a template cannot be selected and/or completed based on catalog or feature categories. In such instances, default responsive content elements, such as generic catalog advertisements or descriptions, can be provided.

At step 216, an interface 278 including the responsive content elements 274 is generated. The interface 278 can include any suitable interface, such as an interface responsive to and/or based on the original request for related content 252. For example, if the request for related content 252 is generated by a search request, the interface 278 can include a search result interface. Similarly, if the request for related content 252 is a request for a catalog page, the interface 278 can include a catalog inventory page. It will be appreciated that any suitable interface 278 can include the responsive content elements 274.

In some embodiments, the interface 278 is generated by an interface generation engine 276. The interface generation engine 276 can be implemented by a system local to and/or remote from a system configured to generate the responsive content elements 274. For example, in some embodiments, the responsive content elements 274 are generated by a first system, such as a first system configured to implement the keyword classification engine 256 and the responsive content generation engine 270, and the interface 278 is generated by a second system, such as a search provider system configured to implement an interface generation engine 276. It will be appreciated that any portion of the disclosed systems and methods can be implemented by any number of virtual and/or physical systems.

The disclosed method 200 of generating keyword-responsive content elements is configured to automatically generate diverse, keyword responsive (e.g., keyword specific) content elements 274, such as keyword-specific titles, descriptions, etc. Responsive content elements 274 can be generated covering varying scopes and/or contexts, based on the selected content templates 272 and/or the feature categories used for completion of the content templates 272 to generate the responsive content elements 274. The generated responsive content elements 274 include specific facet information related to a specific request, e.g., a search request or interface request. The content templates 272 and the facets selected for completion of content templates 272 is configured to ensure consistent, appropriate responsive content element 274 are generated and provided for inclusion in an interface.

Figure 11:
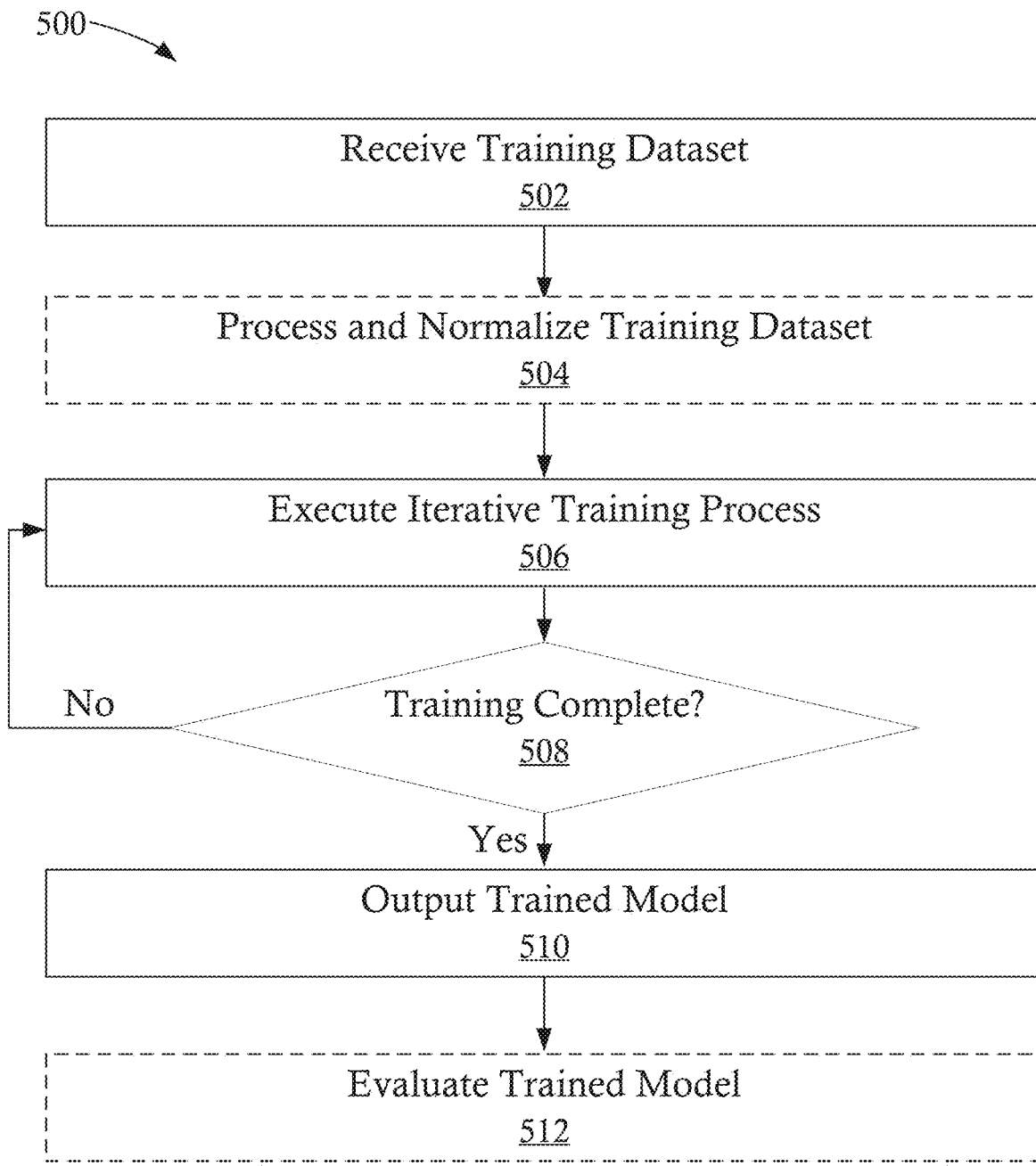
FIG. 11 is a flowchart illustrating a method of generating a trained machine learning model, in accordance with some embodiments.
Figure 12:
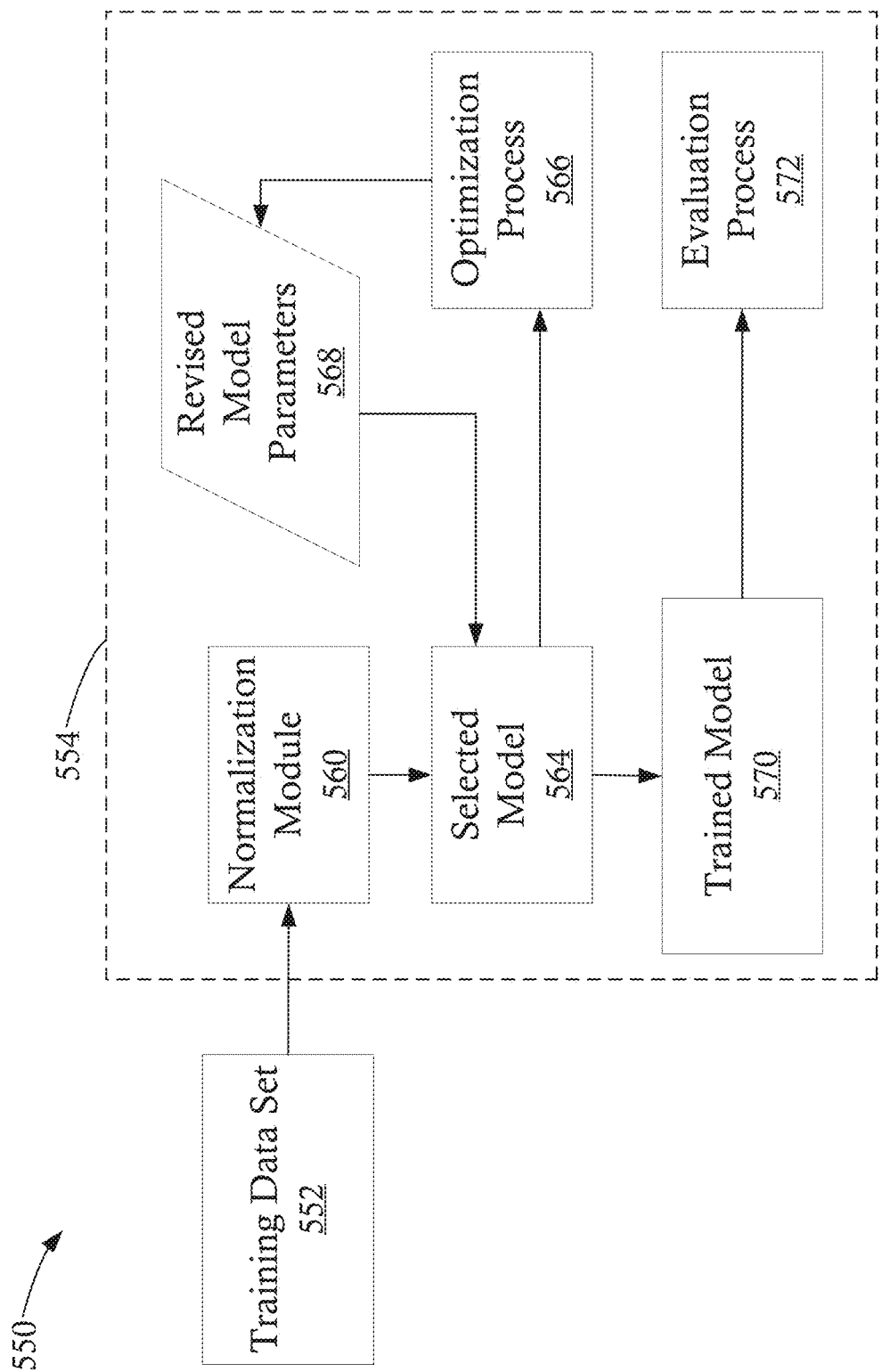
FIG. 12 is a process flow illustrating various steps of the method of generating a trained machine learning model, in accordance with some embodiments.

FIG. 11 is a flowchart illustrating a method 500 of generating a trained machine learning model, in accordance with some embodiments. FIG. 12 is a process flow 550 illustrating various steps of the method 500 of generating a trained machine learning model, in accordance with some embodiments. At step 502, a training dataset 552 is received by model training engine 554. The training dataset 552 can include labeled and/or unlabeled data. For example, in various embodiments, a BERT model, a RoBERTa model, and/or an embedding generation model can be generated using labeled, unlabeled, and/or semi-labelled training data.

The training dataset 552 includes keywords and classifications or categories appropriate to the model being trained. For example, when training a keyword classification model 258, the training dataset 552 can be a labeled dataset including labeled catalog relevant keywords and labeled non-catalog relevant keywords. Similarly, when training a keyword categorization model 264, the training dataset 552 can be a labeled dataset including keywords having an associated catalog category selected from the plurality of potential catalog categories. As another example, when training a facet recognition model, the training dataset 558 can be a labeled dataset including terms and associated facets for a catalog and/or for a particular category within a catalog. The training dataset 552 can be taken from a catalog of items, such as a catalog of items including categorizations and facet information. In some embodiments, the training dataset 552 includes a large dataset incorporating a variety of categories and facets. Although specific embodiments are discussed herein, it will be appreciated that any suitable training dataset 552 can be used.

At optional step 504, the received training dataset 552 is processed and/or normalized by a normalization module 560. In some embodiments, processing of the received training dataset 552 includes outlier detection configured to remove data likely to skew training of a semantic mapping model, such as keywords or titles in a second language, numerical keywords, etc.

At step 506, an iterative training process is executed to train a selected model 564. For example, a model training engine 554 can be configured to obtain a selected model 664 including an untrained (e.g., base) machine learning model, such as an untrained BERT model, an untrained RoBERTa, model, an untrained embedding generation model (e.g., a semantic mapping model), and/or a partially or previously trained model (e.g., a prior version of a trained model, a partially trained model from a prior iteration of a training process, etc.), from a model store, such as a model store database 36. The model training engine 554 is configured to iteratively adjust parameters (e.g., hyperparameters) of the selected model 564 to minimize a cost value (e.g., an output of a cost function) for the selected model 564. In some embodiments, the cost value is related to a difference between an input value, e.g., a title, term, or keyword, and a decoded embedding.

In some embodiments, the model training engine 554 implements an iterative training process that generates a set of revised model parameters 568 during each iteration. The set of revised model parameters 568 can be generated by applying an optimization process 566 to the cost function of the selected model 564. The optimization process 566 can be configured to reduce the cost value (e.g., reduce the output of the cost function) at each step by adjusting one or more parameters during each iteration of the training process.

After each iteration of the training process, at step 508, the model training engine 554 determines whether the training process is complete. The determination at step 508 can be based on any suitable parameters. For example, in some embodiments, a training process can complete after a predetermined number of iterations. As another example, in some embodiments, a training process can complete when it is determined that the cost function of the selected model 564 has reached a minimum, such as a local minimum and/or a global minimum.

At step 510, a trained model 570 is generated and, at optional step 512, the trained model 670 can be evaluated by an evaluation process 572. The trained model 570 can be evaluated based on any suitable metrics, such as, for example, an F or F1 score, normalized discounted cumulative gain (NDCG) of the model, mean reciprocal rank (MRR), mean average precision (MAP) score of the model, and/or any other suitable evaluation metrics. Although specific embodiments are discussed herein, it will be appreciated that any suitable set of evaluation metrics can be used to evaluate a trained semantic mapping model.

Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:
   a non-transitory memory;
   a processor communicatively coupled to the non-transitory memory, wherein the processor is configured to read a set of instructions to:
   receive a request for responsive content including a keyword;
   classify the keyword as one of catalog related or catalog unrelated, wherein catalog related keywords are related to a catalog of items;
   in response to classifying the keyword as catalog related:
   categorize the keyword in one of a plurality of categories associated with the catalog;
   categorize at least one term in the keyword in one of a plurality of facet categories associated with the catalog;
   obtain a content template, wherein the content template includes a category specific template when the keyword is classified as catalog related, and wherein the content template includes a generic template when the keyword is classified as catalog unrelated;
   in response to obtaining the category specific template, populate the category specific template with the at least one term, wherein the at least one term is inserted into the category specific template at a position associated with the one of the plurality of facet categories; and
   transmit responsive content to a system that generated the request, wherein the responsive content includes the category specific template populated with the at least one term when the keyword is classified as catalog related, and wherein the responsive content includes the generic template when the keyword is classified as catalog unrelated.

2. The system of claim 1, wherein the keyword is classified by a trained Bidirectional Encoder Representations from Transformers (BERT) model.

3. The system of claim 1, wherein the keyword is categorized in one of the plurality of categories associated with the catalog by a trained semantic similarity categorization model.

4. The system of claim 3, wherein the trained semantic similarity categorization model comprises a two-tower semantic categorization model.

5. The system of claim 1, wherein the at least one term in the keyword is categorized in one of a plurality of facet categories by a trained question answer model.

6. The system of claim 5, wherein the trained question answer model comprises a Robustly Optimized BERT-Pretraining Approach (RoBERTa) model.

7. The system of claim 1, wherein categorization of the at least one term in the keyword in the one of the plurality of facet categories associated with the catalog is based, in part, on the categorization of the keyword into the one of the plurality of categories.

8. The system of claim 1, wherein the content template is obtained based, in part, on the categorization of the keyword into the one of the plurality of categories.

9. A computer-implemented method, comprising:
receiving a request for responsive content including a keyword;
classifying the keyword as one of catalog related or catalog unrelated, wherein catalog related keywords are related to a catalog of items;
in response to classifying the keyword as catalog related:
categorizing the keyword in one of a plurality of categories associated with the catalog;
categorizing at least one term in the keyword in one of a plurality of facet categories associated with the catalog;
obtaining a content template, wherein the content template includes a category specific template when the keyword is classified as catalog related, and wherein the content template includes a generic template when the keyword is classified as catalog unrelated;
in response to obtaining the category specific template, populating the category specific template with the at least one term, wherein the at least one term is inserted into the category specific template at a position associated with the one of the plurality of facet categories; and
transmitting responsive content to a system that generated the request, wherein the responsive content includes the category specific template populated with the at least one term when the keyword is classified as catalog related, and wherein the responsive content includes the generic template when the keyword is classified as catalog unrelated.

10. The method of claim 9, wherein the keyword is classified by a trained Bidirectional Encoder Representations from Transformers (BERT) model.

11. The method of claim 9, wherein the keyword is categorized in one of the plurality of categories associated with the catalog by a trained semantic similarity categorization model.

12. The method of claim 11, wherein the trained semantic similarity categorization model comprises a two-tower semantic categorization model.

13. The method of claim 9, wherein the at least one term in the keyword is categorized in one of a plurality of facet categories by a trained question answer model.

14. The method of claim 13, wherein the trained question answer model comprises a Robustly Optimized Bidirectional Encoder Representations from Transformers (BERT)-Pretraining Approach (RoBERTa) model.

15. The method of claim 9, wherein categorization of the at least one term in the keyword in the one of the plurality of facet categories associated with the catalog is based, in part, on the categorization of the keyword into the one of the plurality of categories.

16. The method of claim 9, wherein the content template is obtained based, in part, on the categorization of the keyword into the one of the plurality of categories.

17. A non-transitory computer-readable medium having instructions stored thereon, wherein the instructions, when executed by at least one processor, cause a device to perform operations comprising:
receiving a request for responsive content including a keyword;
classifying the keyword as one of catalog related or catalog unrelated, wherein catalog related keywords are related to a catalog of items, and wherein the keyword is classified by a trained Bidirectional Encoder Representations from Transformers (BERT) model;
in response to classifying the keyword as catalog related:
categorizing the keyword in one of a plurality of categories associated with the catalog using a trained semantic similarity categorization model;
categorizing at least one term in the keyword in one of a plurality of facet categories associated with the catalog by a trained question answer model;
obtaining a content template, wherein the content template includes a category specific template when the keyword is classified as catalog related, and wherein the content template includes a generic template when the keyword is classified as catalog unrelated;
in response to obtaining the category specific template, populating the category specific template with the at least one term, wherein the at least one term is inserted into the category specific template at a position associated with the one of the plurality of facet categories; and
transmitting responsive content to a system that generated the request, wherein the responsive content includes the category specific template populated with the at least one term when the keyword is classified as catalog related, and wherein the responsive content includes the generic template when the keyword is classified as catalog unrelated.

18. The non-transitory computer-readable medium of claim 17, wherein the trained semantic similarity categorization model comprises a two-tower semantic categorization model.

19. The non-transitory computer-readable medium of claim 17, wherein the trained question answer model comprises a Robustly Optimized Bidirectional Encoder Representations from Transformers (BERT)-Pretraining Approach (RoBERTa) model.

20. The non-transitory computer-readable medium of claim 17, wherein the content template is obtained based, in part, on the categorization of the keyword into the one of the plurality of categories.

* * * * *